(12) United States Patent
Huynh (10) Patent No.: US 10,618,538 B1
(45) Date of Patent: Apr. 14, 2020

(54) HAND POWERED DOLLY

(71) Applicant: Nhut Huynh, Savannah, GA (US)

(72) Inventor: Nhut Huynh, Savannah, GA (US)

( * ) Notice: Subject to any disclaimer, the term of this patent is extended or adjusted under 35 U.S.C. 154(b) by 0 days.

(21) Appl. No.: 16/269,759

(22) Filed: Feb. 7, 2019

(51) Int. Cl.
  *B62B 1/14* (2006.01)
  *B62B 5/06* (2006.01)
  *B62B 1/12* (2006.01)

(52) U.S. Cl.
  CPC ............ *B62B 1/14* (2013.01); *B62B 1/12* (2013.01); *B62B 5/06* (2013.01); *B62B 2202/10* (2013.01)

(58) Field of Classification Search
  CPC .... B25H 1/04; B25H 3/02; B62B 1/00; B62B 1/12
  See application file for complete search history.

(56) References Cited

U.S. PATENT DOCUMENTS

| | | | | |
|---|---|---|---|---|
| 1,718,962 | A * | 7/1929 | Kimball | B62B 1/12 280/14 |
| 2,519,113 | A * | 8/1950 | Cohn | B62B 1/002 280/30 |
| 3,041,026 | A * | 6/1962 | Wilson | B62B 1/12 248/100 |
| 3,638,888 | A * | 2/1972 | Ross | B65B 67/1205 248/97 |
| 3,754,771 | A * | 8/1973 | Shagoury | B65B 67/1205 280/654 |
| 3,788,413 | A * | 1/1974 | Miller | B62B 5/023 180/8.2 |
| 3,797,847 | A * | 3/1974 | Lindsey | B62B 1/12 280/654 |
| 3,927,898 | A * | 12/1975 | Weyrauch | B62B 1/12 280/47.27 |
| 3,950,004 | A * | 4/1976 | Olsson | B62B 1/26 280/47.18 |
| 3,992,034 | A * | 11/1976 | Smith, Sr. | B62B 1/12 280/654 |
| 4,179,132 | A * | 12/1979 | Rich | B62B 1/14 248/98 |
| 4,241,930 | A * | 12/1980 | Bell | B62B 1/10 280/47.29 |
| D273,522 | S * | 4/1984 | Zastera | D34/17 |
| 4,776,603 | A * | 10/1988 | Watts | B62B 1/12 280/47.27 |
| 5,464,234 | A * | 11/1995 | Ferguson | B62B 5/02 280/47.12 |
| 5,624,224 | A * | 4/1997 | Brandenburg | B62B 1/145 280/47.27 |
| 6,481,727 | B1 * | 11/2002 | Stallbaumer | B62B 1/10 280/47.24 |

(Continued)

*Primary Examiner* — James A Shriver, II
*Assistant Examiner* — James J Triggs
(74) *Attorney, Agent, or Firm* — Sanchelima & Associates, P.A.; Christain Sanchelima; Jesus Sanchelima (57) ABSTRACT

The present invention relates to two wheeled hand powered trucks or dollies for storage and transportation. The dolly, in accordance with the present invention comprises a frame having a top end and a bottom end, a platform extending from the frame, a handle extending rewardly from the top end of the frame, an article retainer extending from the top end of the frame, and a pair of wheels rotatably attached to the bottom end of the frame. The article retainer aids in preventing the fall of the article during the storage and/or transportation of the article over the dolly of the present invention.

10 Claims, 8 Drawing Sheets

(56) References Cited

U.S. PATENT DOCUMENTS

| | | | | |
|---|---|---|---|---|
| 8,152,180 B2* | 4/2012 | Anspach | ............... | B62B 1/12 |
| | | | | 280/47.27 |
| 8,313,113 B2* | 11/2012 | Ryan | ............ | B62B 1/004 |
| | | | | 280/33.991 |
| 9,616,906 B2* | 4/2017 | Carlson | ............. | B62B 1/12 |
| 2009/0152825 A1* | 6/2009 | Adams | ............. | B62B 1/14 |
| | | | | 280/47.31 |
| 2017/0320209 A1* | 11/2017 | Bozzano | ............. | B25H 1/04 |

* cited by examiner

HAND POWERED DOLLY

BACKGROUND OF THE INVENTION

1. Field of the Invention

The present invention relates to the field of hand-powered trucks or dollies. In particular, the present invention relates to two wheeled hand powered trucks or dollies for storage and transportation.

2. Description of the Related Art

A hand powered truck or dolly is employed for enabling easy movement of heavy or unwieldly articles, which if moved by a worker would strain him. Such trucks or dollies are used for articles including bins, bags, cylinders and the like. The article that is to be moved is loaded onto a loading platform of the dolly. There is always a risk that the article being moved may fall off the dolly, which is not desired.

Several designs for dolly have been designed in the past. None of them, however are known to be specifically designed to be risk free and prevent falling of the article being moved by the dolly.

Applicant believes that a related reference corresponds to U.S. Pat. No. 3,927,898 filed by George L. Weyrauch. The Weyrauch reference discloses a hand truck assembly comprising a body member, hand grip means, a toe plate and wheel-axle assembly having two wheels. The hand truck can be disassembled and sold to user who can re-assemble for using the truck. However, the Weyrauch reference fails to disclose a dolly or truck with provision for preventing falling of the load being moved by the truck.

Another related application is U.S. Pat. No. 4,241,930 filed by Dwain C. Bell. The Bell reference discloses a two-wheeled hand truck for transporting articles in a warehouse and the like. However, the Bell reference fails to disclose a dolly or truck with a provision for preventing falling of the load being moved by the truck.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a hand-powered truck or dolly having a provision for preventing falling of the articles being moved or stored.

It is yet another object of the present invention to provide a hand powered truck or dolly that is simple in design and easy to operate.

Further objects of the invention will be brought out in the following part of the specification, wherein detailed description is for the purpose of fully disclosing the invention without placing any limitations thereon.

BRIEF DESCRIPTION OF THE DRAWING

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to FIG. 1 thru FIG. 8, where the present invention is generally referred to with numeral 10, it can be observed that a dolly 10, in accordance with an embodiment of the present invention, comprises a frame 12, a platform 14 extending from the frame 12, a handle 16 extending rewardly from a top end 18 of the frame 12, an article retainer 20 extending from the top end 18 of the frame 12, and a pair of wheels 22 attached to a bottom end 24 of the frame 12. The article retainer 20 hingeably extends from the top end 18 of the frame 12 and can be swung in forward and backward direction.

Figure 1:
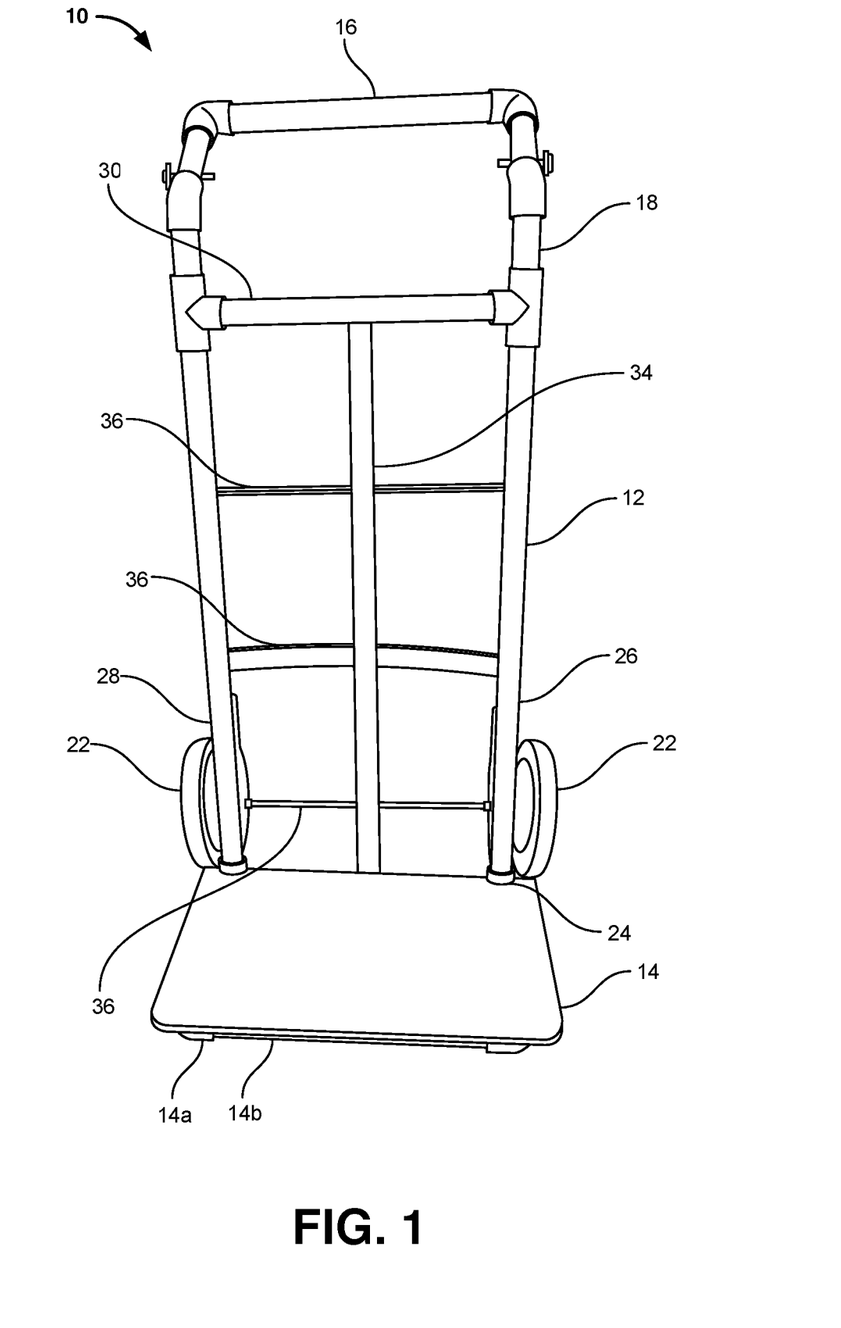
FIG. 1 illustrates a schematic front view of a dolly 10, in accordance with an embodiment of the present invention, wherein the dolly 10 comprises a frame 12, a platform 14 extending from the frame 12, a handle 16 extending rewardly from a top end 18 of the frame 12, and a pair of wheels 22 attached to a bottom end 24 of the frame 12.
Figure 2:
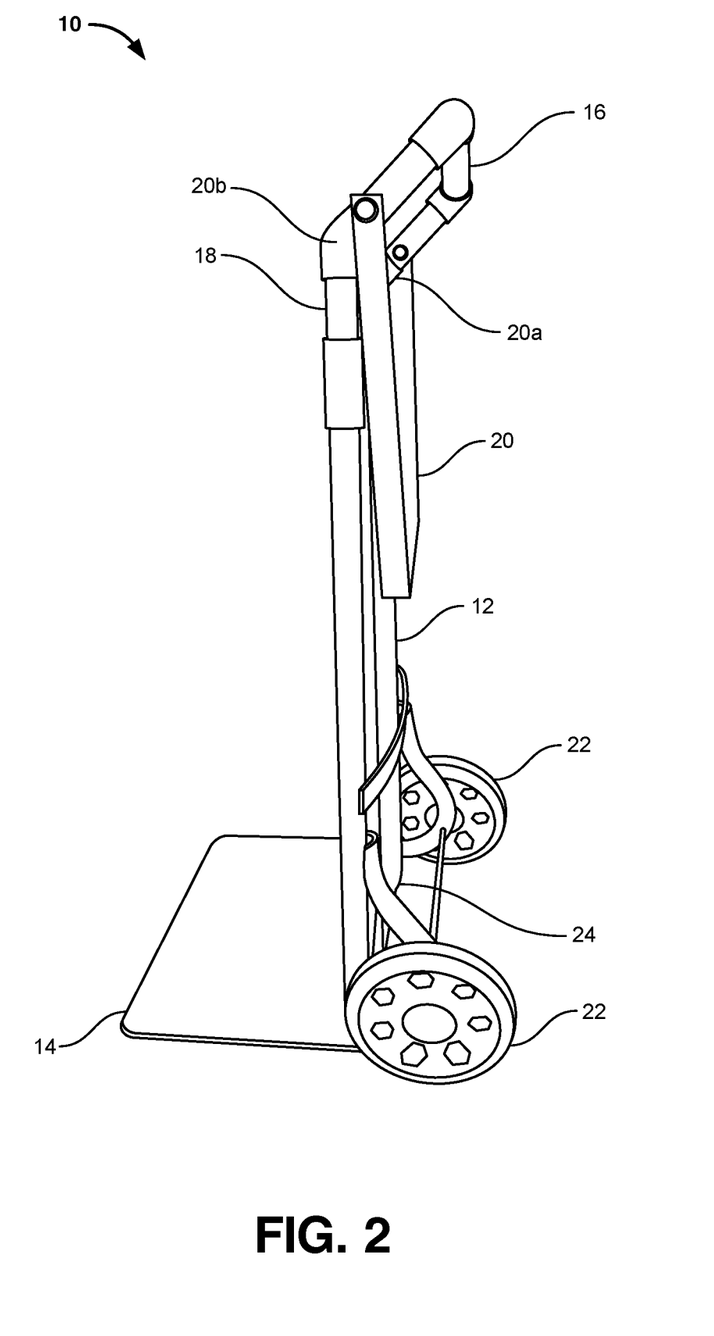
FIG. 2 illustrates a schematic side view of the dolly 10 of FIG. 1, wherein the dolly 10 includes an article retainer 20 extending from the top end 18 of the frame 12.
Figure 3:
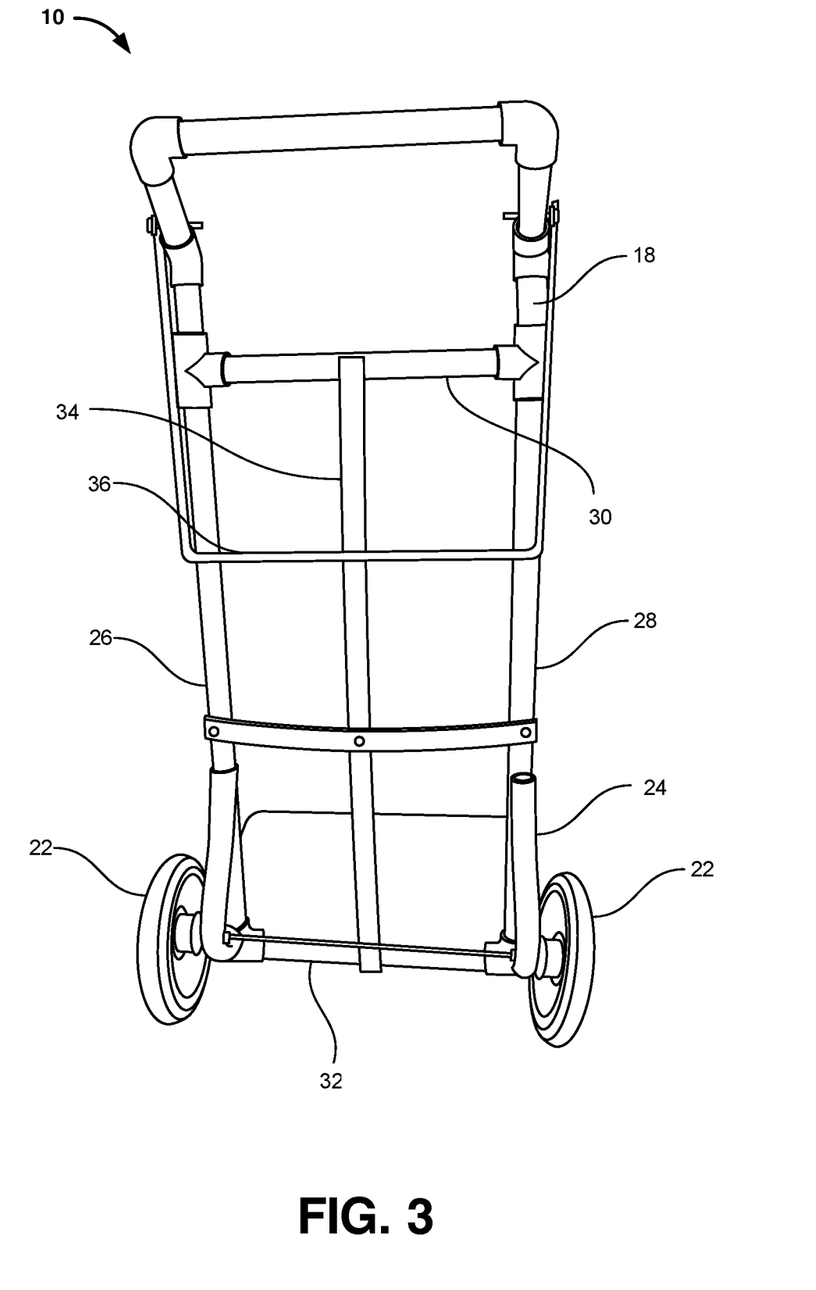
FIG. 3 illustrates a schematic back view of the dolly 10 of FIG. 1.

The frame 12 is defined by a first longitudinal side member 26 and a second longitudinal side member 28, a first lateral side member 30, and a second lateral side member 32. Further, the frame 12 includes at least one middle longitudinal member 34 and one or more intermediate lateral members 36. The number of middle longitudinal members 34 can be increased depending on the article type. If the article is heavy, to provide strength to the frame 12, the number of middle members 34 can be increased to two or three. Similarly, the number of intermediate lateral members 36 can be increased depending on the article.

The first longitudinal side member 26, the second longitudinal side member 28, the first lateral side member 30, the second lateral side member 32, the middle longitudinal member 34, the intermediate lateral members 26 can be fastened to each other by employing fastening means such as nuts and bolts or welded to each other.

The platform 14 extends substantially orthogonally from the frame 12. Further, the platform 14 may include a sub-frame 14a and a flat board 14b, wherein the sub-frame 14a extends from the frame 12. The flat board 14b is secured on top of the sub-frame 14a. The article to be transported or moved can be placed on the platform 14.

The handle 16 extends rewardly from the top end 18 of the frame 12. The handle 16 aids in steering the dolly 10.

The wheels 22 can be attached to the bottom end 24 of the frame 12, wherein the wheels 22 can be rotatably attached employing an axel. The size of the wheels 22 can be suitably chosen depending on the article type and also on the environment in which it is to be used.

The dolly 10 includes an article retainer 20, which is hingeably attached to the top end 18 of the frame 12. The article retainer 20 includes a substantially U-shaped member, wherein the free ends 20a and 20b are fastened to the top end 18 of the frame 12. More specifically, the free ends 20a and 20b are fastened to the first and second longitudinal members 26 and 28, respectively. Using nuts and bolts or rivets or the like fastens the free ends 20a and 20b, such that the fastening means permits swinging action of the article retainer 20. The article retainer 20 can be swung from the back of the frame 12 (see FIG. 2) to the front of the frame (see FIG. 4, FIG. 5 and FIG. 6) and vice-versa.

Figure 4:
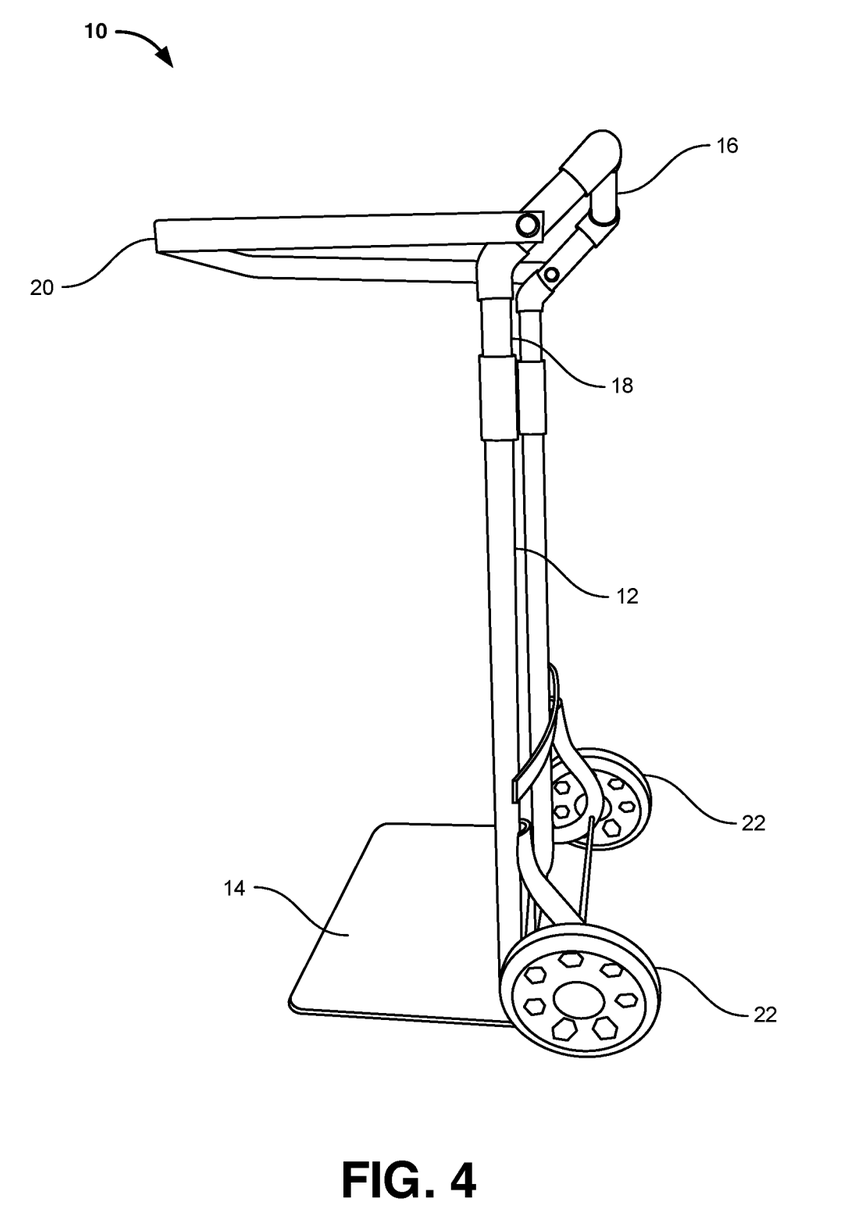
FIG. 4 illustrates a schematic side view of the dolly 10 of FIG. 1, wherein the article retainer 20 is swung in forward direction.
Figure 5:
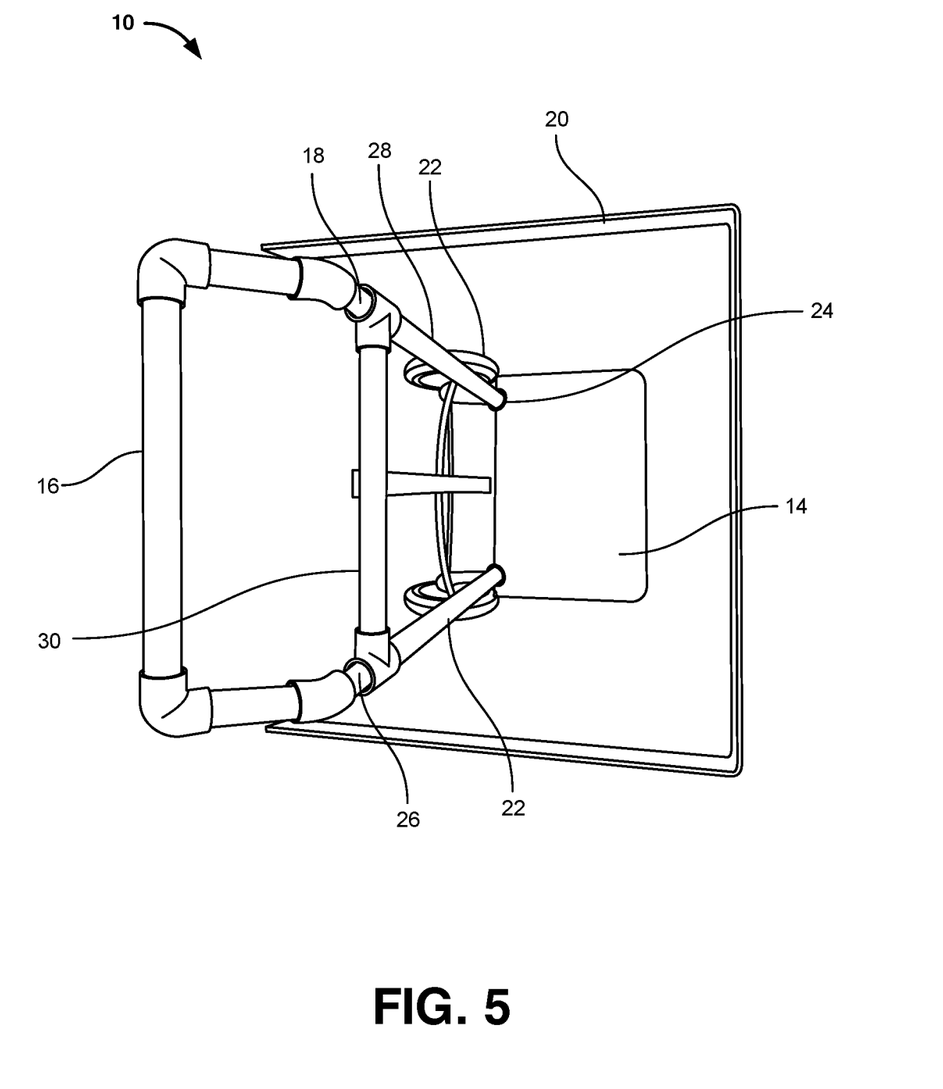
FIG. 5 illustrates a schematic top view of the dolly 10 of FIG. 1, wherein the article retainer 20 is swung in forward direction.
Figure 6:
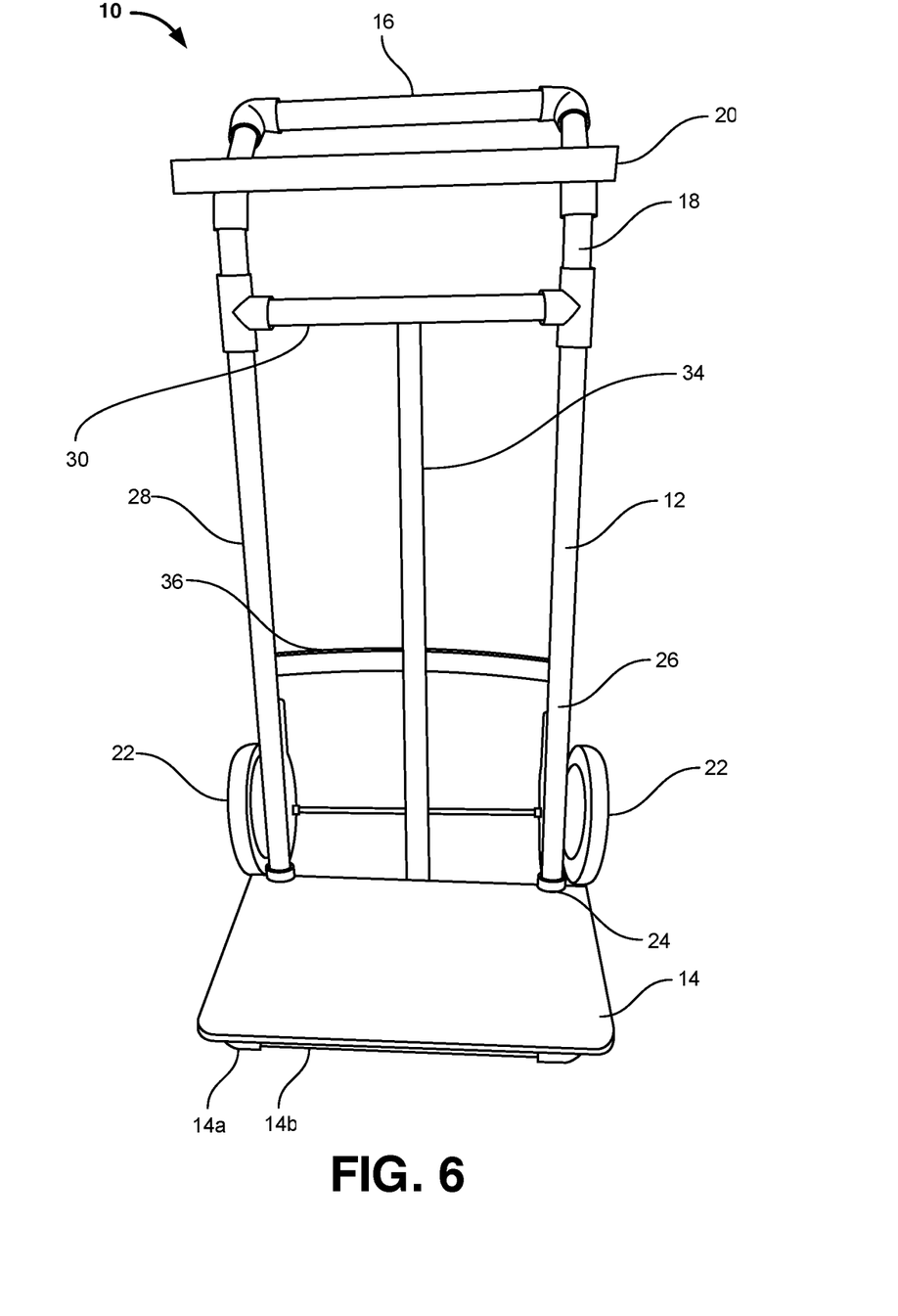
FIG. 6 illustrates a schematic front view of the dolly 10 of FIG. 1, wherein the article retainer 20 is swung in forward direction.

The article retainer 20 can be positioned on the back of the frame 12, when not required and can be swung on to the front of the frame 12 (as shown in FIG. 4) to engage the article suitably. Employing the article retainer 20, it is possible to prevent falling of the article when the dolly 10 is moving. The position of the article retainer 20 in the present embodiment is at around the top end 18 of the frame 12. However, the article retainer 20 can be placed anywhere on the frame 12 depending on the requirement. Further, there can be one or more article retainers.

In accordance with the present invention, the dolly 10 can be made of metals such as steel, iron and aluminum. The dolly 10 can be partly made of metal and partly made of plastic. The components such as the frame 12 and the sub-frame 14a can be made of metal and the other components can be made of plastic. In one embodiment, the dolly 10 can be made of metals, whereas the article retainer 20 can be made of metal or plastic.

Figure 7:
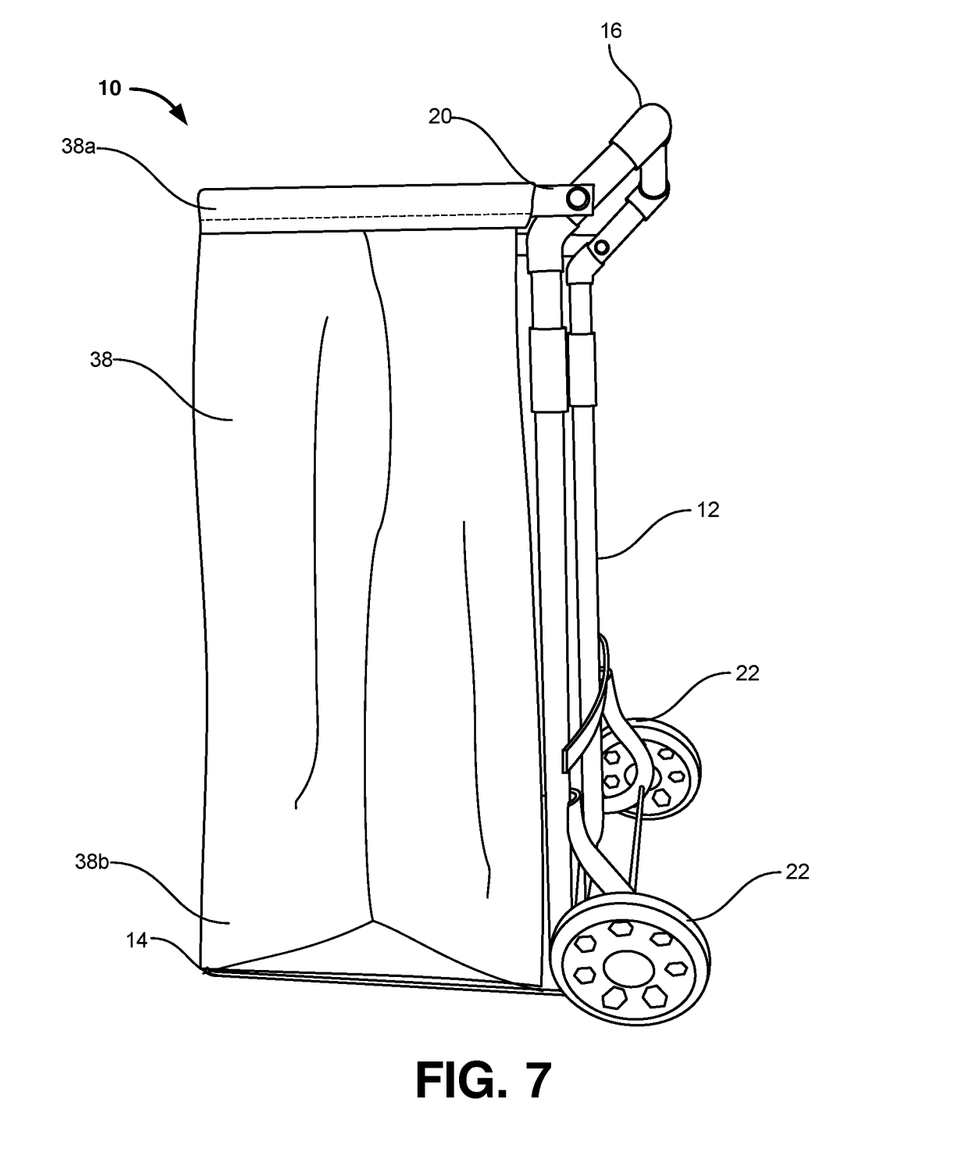
FIG. 7 illustrates a schematic side view of the dolly 10 of FIG. 1, wherein the article retainer 20 is swung in forward direction and accommodate a bag 38 for storing articles, an open end 38a of the bag 38 being secured over the article retainer 20 and a closed end 38b of the bag 38 being rested on the platform 14.

In accordance with an embodiment of the present invention, dolly 10 can further include a bag 38, wherein the bag 38 having an open-end 38a and a closed end 38b. The bag 38 can be secured to the article retainer 20, with the article retainer being swung in forward direction. FIG. 7 illustrates such a configuration of the dolly 10, wherein the article retainer 20 is swung in forward direction and accommodate the bag 38 for storing articles, the open end 38a of the bag 38 being secured over the article retainer 20 and the closed end 38b of the bag 38 being rested on the platform 14.

Figure 8:
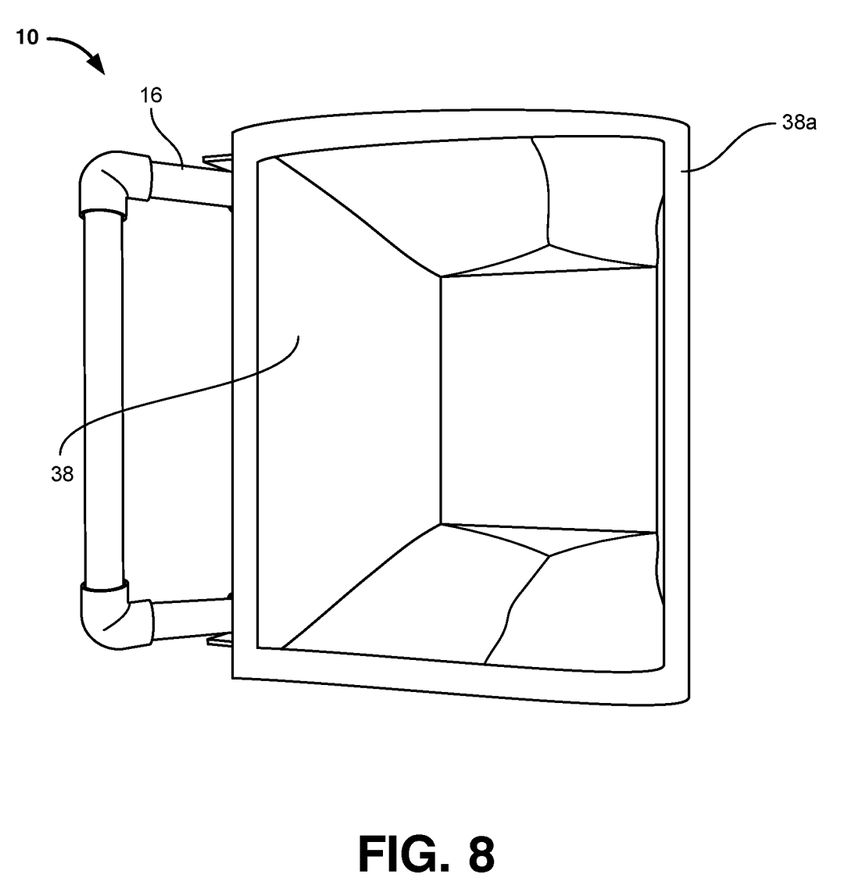
FIG. 8 illustrates a schematic top view of the dolly 10 of FIG. 7 with the bag 38.

FIG. 8 illustrates a schematic top view of the dolly 10 of FIG. 7 with the bag 38, wherein the open-end 38a of the bag 38 is clearly visible.

In accordance with the present invention, the bag 38 can have any cross section, size and length and can be made of any material including jute, paper, polyethylene and the like. The bag 38 can be made of flexible material or a non-flexible material. The material of the bag 38 and the cross section, size and length depends on the article to stored and transported. The closed end 38b may or may not rest on the platform 14.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A dolly comprising:
   a frame having a top end and a bottom end;
   a platform extending from the frame;
   a handle extending backwardly from the top end of the frame;
   an article retainer extending from the top end of the frame;
   a pair of wheels rotatably attached to the bottom end of the frame;
   said frame includes two lateral frame members parallel and opposite each other, each of said two lateral frame members have an outer and inner surface, said article retainer has two lateral top retainer sides each having a proximal end and a distal end, said two lateral top retainer sides are parallel to each other;
   a front top retainer side that is mounted to the distal end of each of said two lateral top retainer sides, the proximal end of each of said two lateral top retainer sides are removably mounted to the outer surface of said two lateral frame members; and
   a removable fastening member adapted to removably and hingedly mount each of said proximal end of said two lateral top retainer sides to the outer surface of said two lateral frame members, said article retainer having an operating position in front of and in perpendicular relationship to said frame and a storage position wherein said article retainer is parallel to and behind said frame, said article retainer having an area of a sufficient dimension so that it clears said handle when hingedly passed from said operating position to said storage position.

2. The dolly according to claim 1, wherein two or more article retainers are mounted to said frame.

3. The dolly according to claim 1, wherein the platform extends substantially orthogonally from the frame.

4. The dolly according to claim 1, wherein the frame includes a sub-frame and a flat board.

5. The dolly according to claim 4, wherein the sub-frame extends from the frame.

6. The dolly according to claim 4, wherein the flat board is secured on top of the sub-frame.

7. The dolly according to claim 1 is made of at least one material selected from the group consisting of iron, steel, aluminum, plastic, and combination thereof.

8. The dolly according to claim 1, wherein the frame further comprises:
   a first longitudinal side member;
   a second longitudinal side member,
   a first lateral side member; and
   a second lateral side member.

9. The dolly according to claim 8, wherein the frame further includes
   at least one middle longitudinal member; and
   one or more intermediate lateral members.

10. The dolly according to claim 2 further including a bag having an open top end and a closed bottom end, said bag is mounted to said two or more article retainers.

* * * * *